United States Patent
Cannons et al.

(10) Patent No.: US 12,148,215 B2
(45) Date of Patent: Nov. 19, 2024

(54) SYSTEMS, METHODS, AND MEDIA FOR MAIN GROUP IDENTIFICATION IN IMAGES VIA SOCIAL RELATION RECOGNITION

(71) Applicants: Kevin James Cannons, Vancouver (CA); Zhan Xu, Richmond (CA); Minlong Lu, Markham (CA)

(72) Inventors: Kevin James Cannons, Vancouver (CA); Zhan Xu, Richmond (CA); Minlong Lu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 17/592,790

(22) Filed: Feb. 4, 2022

(65) Prior Publication Data
US 2023/0252787 A1    Aug. 10, 2023

(51) Int. Cl.
*G06V 20/50*    (2022.01)
*G06F 18/25*    (2023.01)
(Continued)

(52) U.S. Cl.
CPC .............. *G06V 20/50* (2022.01); *G06F 18/25* (2023.01); *G06N 20/00* (2019.01); *G06T 11/00* (2013.01); *G06V 10/225* (2022.01); *G06V 40/103* (2022.01); *G06T 2210/12* (2013.01); *G06V 10/82* (2022.01)

(58) Field of Classification Search
CPC .... G06V 20/50; G06V 40/103; G06V 10/225; G06V 10/82; G06N 20/00; G06F 18/25; G06T 11/00; G06T 2210/12
See application file for complete search history.

(56) References Cited

U.S. PATENT DOCUMENTS

| | | | |
|---|---|---|---|
| 2010/0245612 A1* | 9/2010 | Ohashi | H04N 23/635 348/222.1 |
| 2011/0150340 A1* | 6/2011 | Gotoh | G06V 40/175 382/190 |

(Continued)

FOREIGN PATENT DOCUMENTS

| | | |
|---|---|---|
| CN | 104917954 A | 9/2015 |
| CN | 111967312 A | 11/2020 |

OTHER PUBLICATIONS

Hong, Fa-Ting, Wei-Hong Li, and Wei-Shi Zheng. "Learning to Detect Important People in Unlabelled Images for Semi-supervised Important People Detection." in Computer Vision and Pattern Recognition (CVPR), 2020.

(Continued)

*Primary Examiner* — Utpal D Shah

(57) ABSTRACT

Systems, methods, and computer-readable media for identifying a main group of people in an image via social relation recognition. The main group of people is identified within an image by identifying social relationships between people visible in the image. The identification of social relationships is performed by a Social Relation Recognition Network (SRRN) trained using deep learning. The SRRN combines two techniques for group identification, First Glance and Graph Reasoning, and fuses their outputs to generate a prediction of group membership. A group refinement module improves and filters the group membership after identification of an initial main group.

18 Claims, 11 Drawing Sheets

(51) Int. Cl.
  *G06N 20/00*  (2019.01)
  *G06T 11/00*  (2006.01)
  *G06V 10/22*  (2022.01)
  *G06V 40/10*  (2022.01)
  *G06V 10/82*  (2022.01)

(56) References Cited

U.S. PATENT DOCUMENTS

| | | | | |
|---|---|---|---|---|
| 2012/0303610 | A1* | 11/2012 | Zhang | G06F 16/51 707/739 |
| 2014/0010463 | A1* | 1/2014 | Kato | G06T 11/60 382/218 |
| 2015/0261994 | A1* | 9/2015 | Yamaji | G06V 40/161 382/118 |
| 2023/0126712 | A1* | 4/2023 | Yamaguchi | G06V 40/161 382/155 |
| 2023/0267712 | A1* | 8/2023 | Kommrusch | G06V 10/7788 382/157 |

OTHER PUBLICATIONS

Solomon Mathialagan, Clint, Andrew C. Gallagher, and Dhruv Batra. "Vip: Finding important people in images." in Computer Vision and Pattern Recognition (CVPR), 2015.

Li, Wei-Hong, Fa-Ting Hong, and Wei-Shi Zheng. "Learning to learn relation for important people detection in still images." in Computer Vision and Pattern Recognition (CVPR), 2019.

Flickner, Myron D., and R. Ismail Haritaoglu. "Method of detecting and tracking groups of people." U.S. Pat. No. 7,688,349. Mar. 30, 2010.

Choi, Wongun, Yu-Wei Chao, Caroline Pantofaru, and Silvio Savarese . . . "Discovering groups of people in images." in European conference on computer vision (ECCV), 2014.

Varadarajan, Jagannadan, Ramanathan Subramanian, Samuel Rota Bulò, Narendra Ahuja, Oswald Lanz, and Elisa Ricci. "Joint estimation of human pose and conversational groups from social scenes." International Journal of Computer Vision 126, No. 2-4 (2018): 410-429.

Zhang, Lu, and Hayley Hung. "Beyond f-formations: Determining social involvement in free standing conversing groups from static images." in computer vision and pattern recognition (CVPR), 2016.

Chamveha, Isarun, Yusuke Sugano, Yoichi Sato, and Akihiro Sugimoto. "Social Group Discovery from Surveillance Videos: A Data-Driven Approach with Attention-Based Cues." In BMVC. 2013.

Tran, Khai N., Apurva Gala, Ioannis A. Kakadiaris, and Shishir K. Shah. "Activity analysis in crowded environments using social cues for group discovery and human interaction modeling." Pattern Recognition Letters 44 (2014): 49-57.

Li, Junnan, et al. "Dual-glance model for deciphering social relationships." in ICCV 2017.

Wang, Zhouxia, et al. "Deep reasoning with knowledge graph for social relationship understanding." in IJCAI 2018.

Cui, Yin, et al. "Class-balanced loss based on effective number of samples." in CVPR 2019.

Yujia Li, Daniel Tarlow, Marc Brockschmidt, and Richard Zemel. Gated graph sequence neural networks. arXiv preprint arXiv:1511. 05493, 2015.

* cited by examiner

SYSTEMS, METHODS, AND MEDIA FOR MAIN GROUP IDENTIFICATION IN IMAGES VIA SOCIAL RELATION RECOGNITION

RELATED APPLICATION DATA

This is the first patent application related to this matter.

TECHNICAL FIELD

The present disclosure relates to computer vision, and in particular, to systems, methods, and computer-readable media for identifying a main group of people in an image via social relation recognition.

BACKGROUND

With the rapid growth of cameras in smartphones, millions of pictures are taken every day. Many of these images contain a main person, or photographic subject, that the photographer intended to capture. Furthermore, many of these images contain not just a single main person, but a group of one or more people intended to be subjects of the photograph, thereby forming a main group of people.

Computer vision techniques have been developed to identify a main person in a photograph. In these existing approaches to main person identification, the goal is to the rank all the people in the photograph with an importance score. Persons within the photograph that have higher importance scores are considered to be more influential or salient, or to be more likely to be the photographer's intended subject. Thus, the most salient or influential person within the image is the person with the highest score. A significant limitation of these existing approaches is that they provide no indication regarding any group membership of the most influential person. In other words, these existing approaches do not identify if the most influential person is by himself or herself, or if he or she is part of a group.

Other computer vision techniques have been developed to identify various groups of people visible in a photograph. In these existing approaches to group identification, the goal is to process a photograph and identify all the separate groups of people visible within the photograph. A significant limitation of these existing approaches is that they identify the boundaries between each group of persons, but do not offer any insight into which group of people is the most important. Additionally, on a technical level, these existing approaches tend to rely on simple spatial cues (e.g. proximity, relative poses, actions, interactions, trajectories) for group identification. These spatial cues are generally insufficient to determine if two people belong to the same group, resulting in inaccuracies in the results of these approaches.

FIGS. 1A and 1B show two example photographs 100, 120 providing examples of how spatial cues, as used by the existing approaches described above, may be ineffective in determining group membership. FIG. 1A is a photograph 100 showing a girl 102 and woman 104 denoted by bounding boxes 110. Other people in the scene are marked with bounding boxes 110 as well. Based on image-based spatial proximity, the existing approaches to group identification described above may conclude that the girl 102 and the individual 106 in the background belong in the same group, as their bounding boxes 110 overlap. Moreover, the woman 104 is quite far removed from the girl 102 as defined by the pixel spaces occupied by their respective bounding boxes 110, so these existing approaches may conclude that the woman 104 belongs in a different group from the girl 102.

In this image 100, it is apparent that the girl 102 and woman 104 have a family-style relationship (e.g., daughter/mother), and it would be desirable if computer vision techniques could be developed to identify this relationship and group the girl 102 and woman 104 together accordingly.

Similarly, in the image 120 of FIG. 1B, a group of five construction workers 122, 124, 126, 128, 130 is visible and marked by bounding boxes 110. Two other people are visible and marked with bounding boxes 110, one of whom is passing directly behind the construction workers (between construction worker 124 and construction worker 126). The existing approaches to group identification described above may fail to identify the construction workers 122, 124, 126, 128, 130 as a single group based on purely spatial cues, because the construction workers are spread out across the entire width of the image. Moreover, there is significant variation in the construction workers' poses (e.g., construction worker 122 is bending over, construction worker 130 is leaning forward on a rake, and the others 124, 126, 128 are standing straight up) as well as their actions (e.g., raking, picking things up, talking), which presents a challenge to the techniques used by existing approaches to identify shared group membership of people in photographs. Thus, it would be desirable if computer vision techniques could be developed to correctly identify that these construction workers 122, 124, 126, 128, 130 all share the social relation of co-workers (e.g., via visual similarities in the uniforms they are wearing) in order to correctly group the construction workers together.

In view of the foregoing, there is a need for a method for computer vision techniques that overcome one or more of the limitations of existing approaches identified above.

SUMMARY

The present disclosure provides systems, methods, and computer-readable media for identifying a main group of people in an image via social relation recognition. In some examples, the main group of people is identified within an image by identifying social relationships between people visible in the image. In some examples, the identification of social relationships is performed by a model trained using machine learning, such as an artificial neural network-based model, and may be referred to as a Social Relation Recognition Network (SRRN). In some examples, the model is trained using deep learning. In some examples, the model combines two techniques for group identification, First Glance and Graph Reasoning, and fuses their outputs to generate a prediction of group membership.

As used herein, the term "person" (and the plural "persons" or "people") refers to a human being or other entity having a body visible in an image that expresses personality or sociality. In some contexts, a "person" may refer to a visual portrayal of a human being or of an anthropomorphic character or object having a visible personality or visible indications of sociality, such as relations with other persons visible in an image.

As used herein, the term "group" refers to a set of two or more people visible within an image. In some contexts, a group may be defined by a shared characteristic, or the members of a group may be linked by one or more relations between them.

As used herein, the term "relation" refers to any information relating to the presence, absence, or characteristics of a relation between or among two or more people, such as the presence or absence of a social relationship, the nature of a social relationship, or the presence, absence or characteristics of a non-social relationship (e.g., a spatial relationship between two people visible in an image).

As used herein, the term "social relationship" refers to an intimate or non-intimate social connection or relation that exists between or among two or more people visible in an image. Examples of social relationships include friendship, family relations, romantic or marital relations, professional relations (such as a relationship between co-workers), and commercial relations (such as the relation of a diner to a server or a customer to a sales clerk).

As used herein, statements that a person is "visible" within an image may mean that at least a portion of the person is visible within the image.

As used herein, statements that a second item (e.g., a value, calculation, or determination) is "based on" a first item may mean that characteristics of the second item are affected or determined at least in part by characteristics of the first item. The first item may be considered an input to an operation or calculation, or a series of operations or calculations, that produces the second item as an output that is not independent from the first item.

In at least some aspects, the disclosure relates to a computer-implemented method for identifying a main group of people in an image. The image is processed to generate people data identifying a plurality of people at least partially visible in the image. The people data is processed to generate main person data identifying a main person of the plurality of people, each other person of the plurality of people being a secondary person. The people data and the main person data are processed to generate, for each secondary person, relation data characterizing a relation between the secondary person and the main person. The relation data for the secondary people is processed to generate main group data identifying a main group of people comprising the main person and one or more main group members selected from the secondary people.

In at least some aspects, the disclosure relates to a computing system comprising a processor and a memory storing processor-executable instructions thereon. The instructions, when executed by the processor, cause the computing system to identify a main group of people in an image. The image is processed to generate people data identifying a plurality of people at least partially visible in the image. The people data is processed to generate main person data identifying a main person of the plurality of people, each other person of the plurality of people being a secondary person. The people data and the main person data are processed to generate, for each secondary person, relation data characterizing a relation between the secondary person and the main person. The relation data for the secondary people is processed to generate main group data identifying a main group of people comprising the main person and one or more main group members selected from the secondary people.

In at least some aspects, the disclosure relates to a non-transitory processor-readable medium having machine-executable instructions stored thereon which, when executed by a processor of a device, cause the device to identify a main group of people in an image. The image is processed to generate people data identifying a plurality of people at least partially visible in the image. The people data is processed to generate main person data identifying a main person of the plurality of people, each other person of the plurality of people being a secondary person. The people data and the main person data are processed to generate, for each secondary person, relation data characterizing a relation between the secondary person and the main person. The relation data for the secondary people is processed to generate main group data identifying a main group of people comprising the main person and one or more main group members selected from the secondary people.

In some examples, the people data comprises, for each person of the plurality of people, a bounding box.

In some examples, processing the people data to generate the main person data comprises processing: a size of each bounding box, and a distance from a center of the image of each bounding box to generate the main person data.

In some examples, the relation data comprises a binary relation value indicating the presence or absence of a social relationship.

In some examples, the relation data is generated by a model trained using machine learning.

In some examples, the model comprises a trained First Glance network trained using a class-balanced loss.

In some examples, the model comprises a trained Graph Reasoning model.

In some examples, the model further comprises a trained Graph Reasoning model, and the model generates the relation data by fusing an output of the trained First Glance network and an output of the trained Graph Reasoning model.

In some examples, fusing the outputs of the trained First Glance model and the trained Graph Reasoning model comprises: summing an output of a softmax function of the trained First Glance network and an output of a softmax function of the trained Graph Reasoning model to generate a fused softmax value, and generating a binary relation value, indicating the presence or absence of a social relationship, based on the fused softmax value.

In some examples, processing the relation data to generate the main group data comprises a number of steps. The one or more main group members are selected from the secondary people based on whether the relation data for a respective secondary person indicates a relation to the main person. The main person and the selected one or more main group members constitute an initial main group. The initial main group is refined by processing at least a portion of the people data to generate, for each selected main group member of the secondary people, secondary relation data characterizing a relation of the selected main group member to each other secondary person, and processing the secondary relation data for each initial main group member to generate improved main group data identifying members of an improved main group. The main group data is based on the improved main group data.

In some examples, processing the relation data to generate the main group data further comprises removing at least one member from the improved main group to generate filtered improved main group data by processing the improved main group data and one or more of the following characteristics of the person data: a bounding box size differential of the at least one member relative to the main person, a view direction differential of the at least one member relative to the main person, and a bounding box location of the at least one member relative to at least one other improved main group member. The main group data is based on the filtered improved main group data.

In some examples, the filtered improved main group data is generated by processing at least the bounding box location of the at least one member relative to at least one other improved main group member. Processing the bounding box location of the at least one member relative to at least one other improved main group member comprises determining that the at least one member is located on an edge of the improved main group, and determining that a spatial gap between the at least one member and a closest other improved main group member is greater in size than any gap between any two other improved main group members.

In some examples, the relation data is generated by a model comprising a First Glance network trained using machine learning using a class-balanced loss, and a Graph Reasoning model trained using machine learning. The model generates the relation data by fusing an output of the First Glance network and an output of the Graph Reasoning model. An output of a softmax function of the First Glance network and an output of a softmax function of the Graph Reasoning model are summed to generate a fused softmax value. A binary relation value is generated, indicating the presence or absence of a social relationship, based on the fused softmax value.

In at least some aspects, the disclosure relates to a non-transitory processor-readable medium having machine-executable instructions stored thereon which, when executed by a processor of a device, cause the device to perform one or more of the methods described above.

BRIEF DESCRIPTION OF THE DRAWINGS

Embodiments will now be described by way of examples with reference to the accompanying drawings, in which like reference numerals may be used to indicate similar features.

DESCRIPTION OF EXAMPLE EMBODIMENTS

Figure 1B:
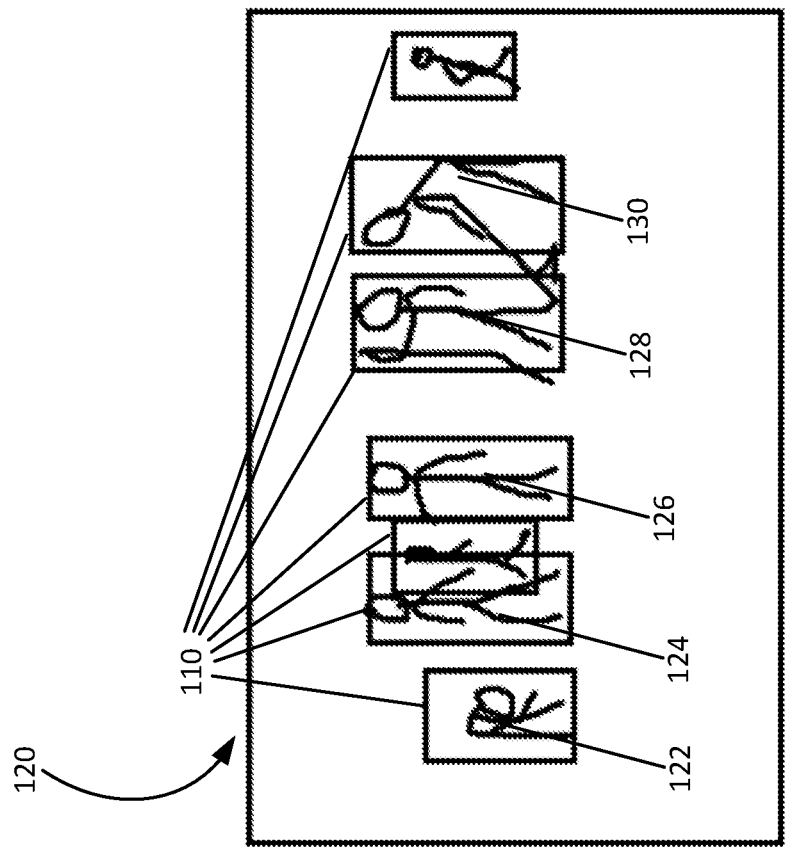
FIG. 1B is an image of a group of construction workers, showing an example of image data which may be processed by existing approaches or example embodiments described herein.
Figure 1A:
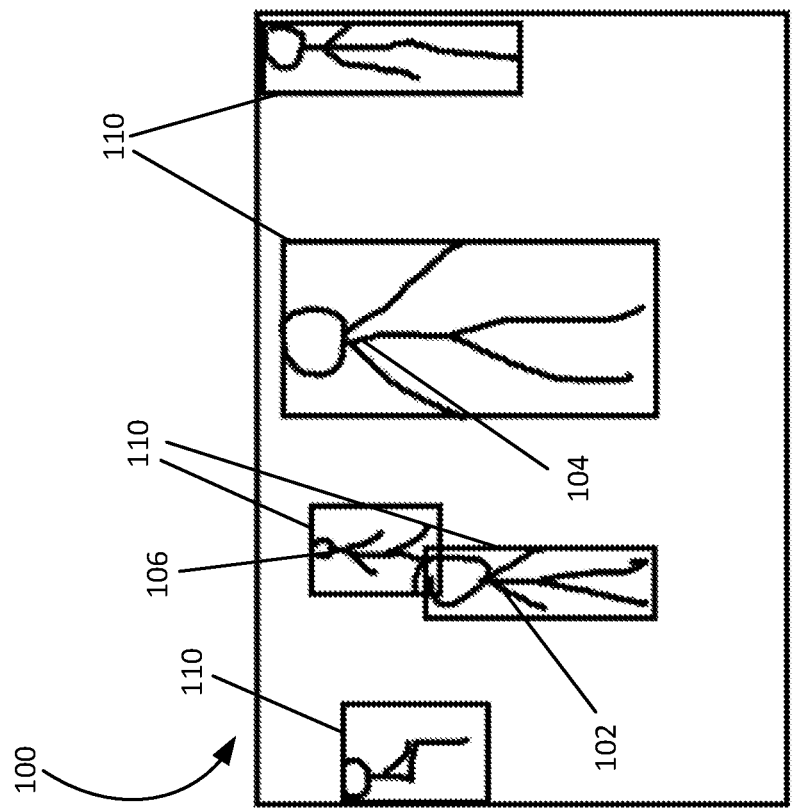
FIG. 1A is an image of a girl and a woman, showing an example of image data which may be processed by existing approaches or example embodiments described herein.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Example embodiments of methods, devices and computer-readable media for identifying a main group of people in an image via social relation recognition will now be described. Some example embodiments use models trained using machine learning algorithms (also called "machine learning models"), such as trained neural networks, to perform all or part of the methods and operations described herein.

Whereas the examples described herein will refer to identifying groups of human people in photographs, it will be appreciated that the techniques described herein are potentially applicable to other problem domains, such as group identification of painted or drawn characters (including non-human characters) in illustrations or video frames. With a properly labelled training dataset, the machine learning techniques described herein could be used to train a model to perform a group identification task in a problem domain matching the training dataset.

Social relationships are defined as patterned human interactions that encompass relationships among two or more people. Social relations form the basis of social structure in our daily life. They are well studied in social science and have been recently adopted in the computer vision community.

Figure 1C:
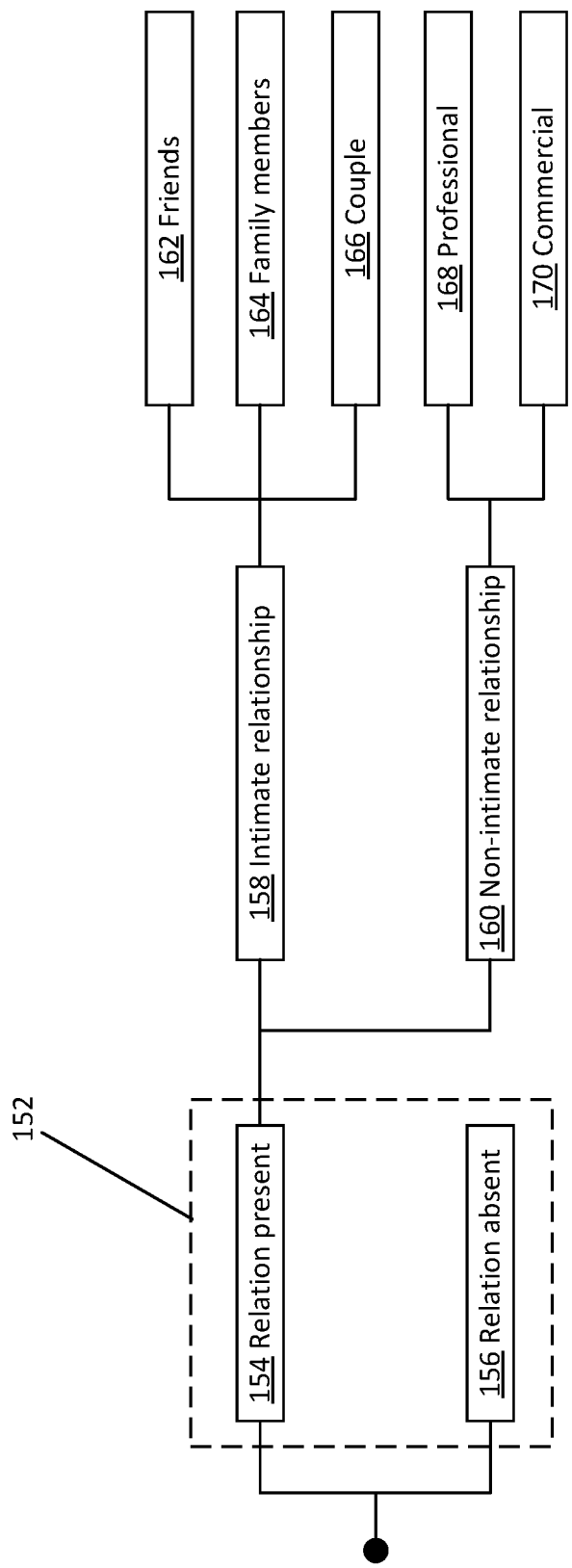
FIG. 1C is a hierarchical graph showing types of social relationship information, as may be processed and/or generated by example embodiments described herein.

FIG. 1C shows a hierarchical graph of different types of social relationship information. At the most basic level, as shown by rectangle 152, social relationship information can include a binary value indicating the presence of a social relationship 154 or absence of a social relationship 156. If a social relationship is present (154), it may be an intimate social relationship 158 or a non-intimate social relationship 160. Intimate social relationships 158 include friends 162, family members 164, and couples 166. Non-intimate social relationships 160 include professional relationships 168 and commercial relationships 170.

Some examples described herein may use social relationship information that is limited to the binary value indicated by rectangle 152. Other examples may use more detailed social relationship information, such as the distinction between intimate 158 and non-intimate 160 social relationships, or the more detailed sub-types of social relationships 162, 164, 166, 168, 170.

Example devices and systems will now be described that perform the group identification operations and methods described herein.

Example Device and System

Figure 2:
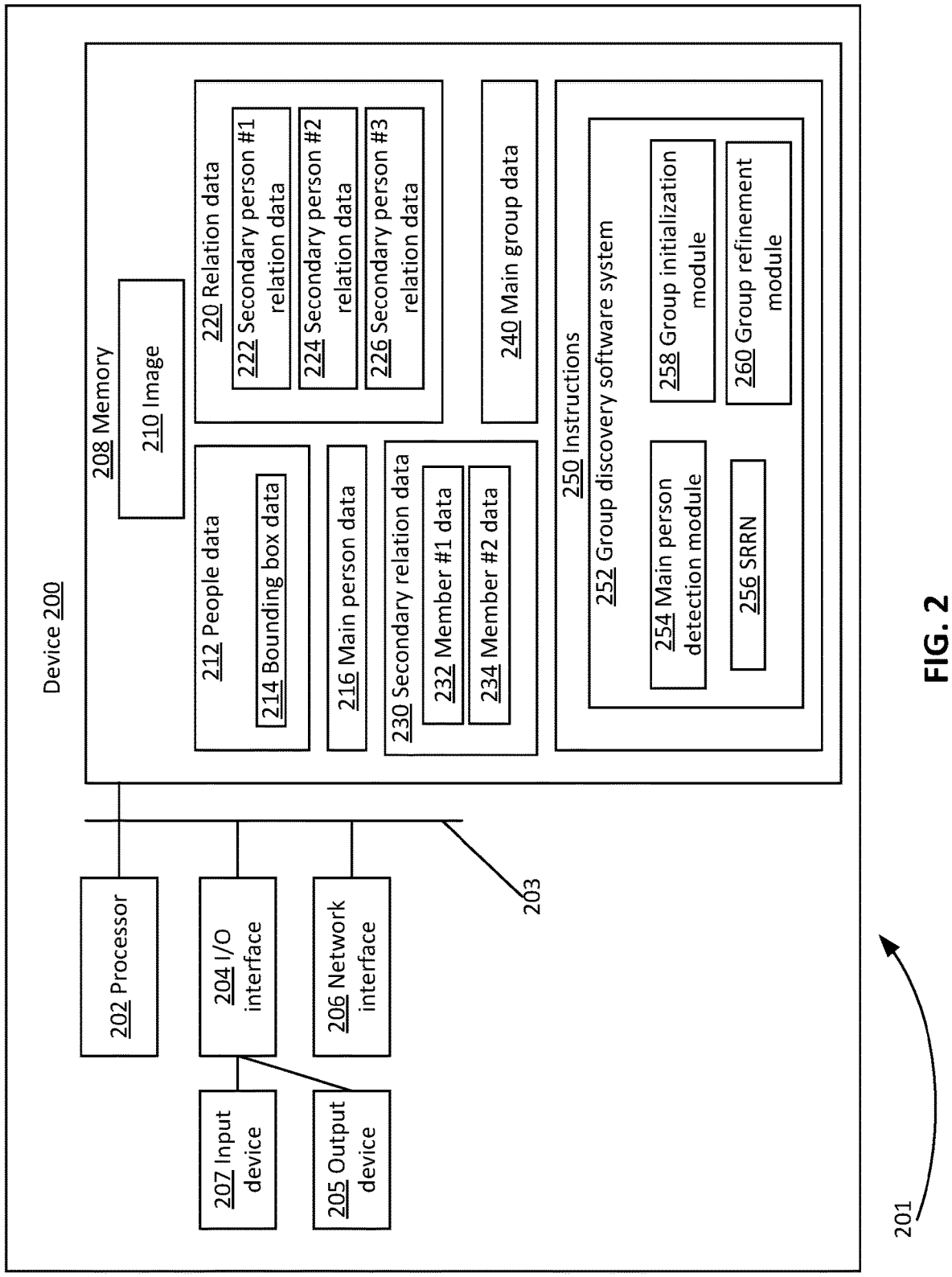
FIG. 2 is a block diagram of an example device for identifying a main group of people in an image via social relation recognition, according to example embodiments described herein.

FIG. 2 is a block diagram illustrating a simplified example of a device 200, such as a computer or a cloud computing platform, suitable for implementing examples described herein, and in particular for executing the method steps and operations described herein. Other examples suitable for implementing embodiments described in the present disclosure may be used, which may include components different from those discussed below. Although FIG. 2 shows a single instance of each component, there may be multiple instances of each component in the device 200. In some embodiments, the device 200 operates as part of a system 201, which may distribute the various operations described herein over more than one computing device included in the system 201.

The device 200 may include one or more processor devices, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof (the processor devices being referred to collectively as a processor 202). The device 200 may also include one or more optional input/output (I/O) interfaces (collectively referred to as I/O interface 204), which may enable interfacing with one or more input devices 207 (such as a keyboard, mouse, touchscreen, or camera) and/or output devices 205 (such as a display or speaker).

In the example shown, the input device(s) 207 and output device(s) 205 are shown as external to the device 200. However, it will be appreciated that some embodiments may combine one or more of the input devices 207 and/or output devices 205 into a single device.

The device 200 may include one or more network interfaces for wired or wireless communication with one or more devices or systems of a network, such as a network (collectively referred to as network interface 206). The network interface 206 may include wired links (e.g., Ethernet cable) and/or wireless links (e.g., one or more antennas) for intra-network and/or inter-network communications. In some embodiments, the device 200 may communicate with one or more of the input devices 207 and/or output devices 205 over a network using the network interface 206 instead of the I/O interface 204.

The device 200 may include one or more non-transitory memories (collectively referred to as memory 208), which may include a volatile or non-volatile memory (e.g., a flash memory, a random access memory (RAM), and/or a read-only memory (ROM)). The non-transitory memory 208 may store instructions 250 for execution by the processor 202, such as to carry out examples described in the present disclosure. The memory 208 may also include other processor-executable instructions 250, such as for implementing an operating system and other applications/functions. In some examples, the memory 208 may include instructions 250 for execution by the processor 202 to implement a group identification software system 252, including the various modules thereof and the SRRN 256, as described further below with reference to FIGS. 3-10. The group identification software system 252 may be loaded into the memory 208 by executing the instructions 250 using the processor 202.

The memory 208 may also store data used and/or generated by the group identification software system 252, as described in greater detail below with reference to FIGS. 3-10.

In some examples, the device 200 may additionally or alternatively execute instructions from an external memory (e.g., an external drive in wired or wireless communication with the device 200) or may be provided executable instructions by a transitory or non-transitory computer-readable medium. Examples of non-transitory computer readable (i.e. processor readable) media include a RAM, a ROM, an erasable programmable ROM (EPROM), an electrically erasable programmable ROM (EEPROM), a flash memory, a CD-ROM, or other portable memory storage.

The device 200 may also include a bus 203 providing communication among components of the device 200, including those components discussed above. The bus 203 may be any suitable bus architecture including, for example, a memory bus, a peripheral bus or a video bus.

It will be appreciated that various components and operations described herein can be implemented on multiple separate devices or systems in some embodiments. In such examples, the bus 203 may be a network link or other communication link enabling communication between multiple devices or components of the system.

In some embodiments, one or more of the operations of the group identification software system 252 described herein may be performed by hardware logic instead of software, for example by including as part of the device 200 one or more application-specific integrated circuits (ASICs) or field programmable gate arrays (FPGAs) configured to perform the described operations.

Machine Learning

Machine Learning (ML) is an artificial intelligence technique in which algorithms are used to construct or build a "model" for a specific task from sample data that is capable of being applied to new input data to perform the specific task (i.e., making predictions or decisions based on new input data) without being explicitly programmed to perform the specific task.

As used herein, "model" shall refer to a machine learned model. A machine learned model refers to an executable computational structure, such as processor-executable software instructions, that can be executed. During training of the model, the parameters of the model are learned using sample data (e.g. data from a training dataset). Once the model has been trained, the trained model can be deployed and operated in an inference mode (e.g. applied to new input data) to perform the specific task (i.e. make predictions or decisions based on the new input data).

The machine learned models described herein may be approximated by differentiable convolutional neural networks that have been trained (e.g., using supervised learning) to perform a task, such as feature extraction, person identification, and relation identification.

However, it will be appreciated that various embodiments of the systems, devices, and methods described herein may be equally applicable to other tasks described herein, other neural network architectures (such as fully connected or recurrent neural networks), and other machine learning techniques, including other deep learning techniques, with appropriate changes to certain operations. Furthermore, some of the embodiments of the systems, devices, and methods described herein may have applications outside of the machine learning context.

The structure and operation of the group identification software system 252 will now be described with reference to FIGS. 3-10. The schematic diagrams of the group identification software system 252 and its modules in FIG. 3 will be described in connection with the steps and operations of the method performed thereby, shown in the flowchart of FIG.

4. Further details of the group refinement module 260 of the group identification software system 252, shown in the schematic diagram of FIG. 5, will be described in connection with the steps and operations of the method performed thereby, shown in the flowchart of FIG. 6. Further details of the SRRN 256 of the group identification software system 252, shown in the schematic diagram of FIG. 7 and in further detail in FIGS. 9-10, will be described in connection with the steps and operations of the method performed thereby, shown in the flowchart of FIG. 8.

Group Identification Software System

Figure 3:
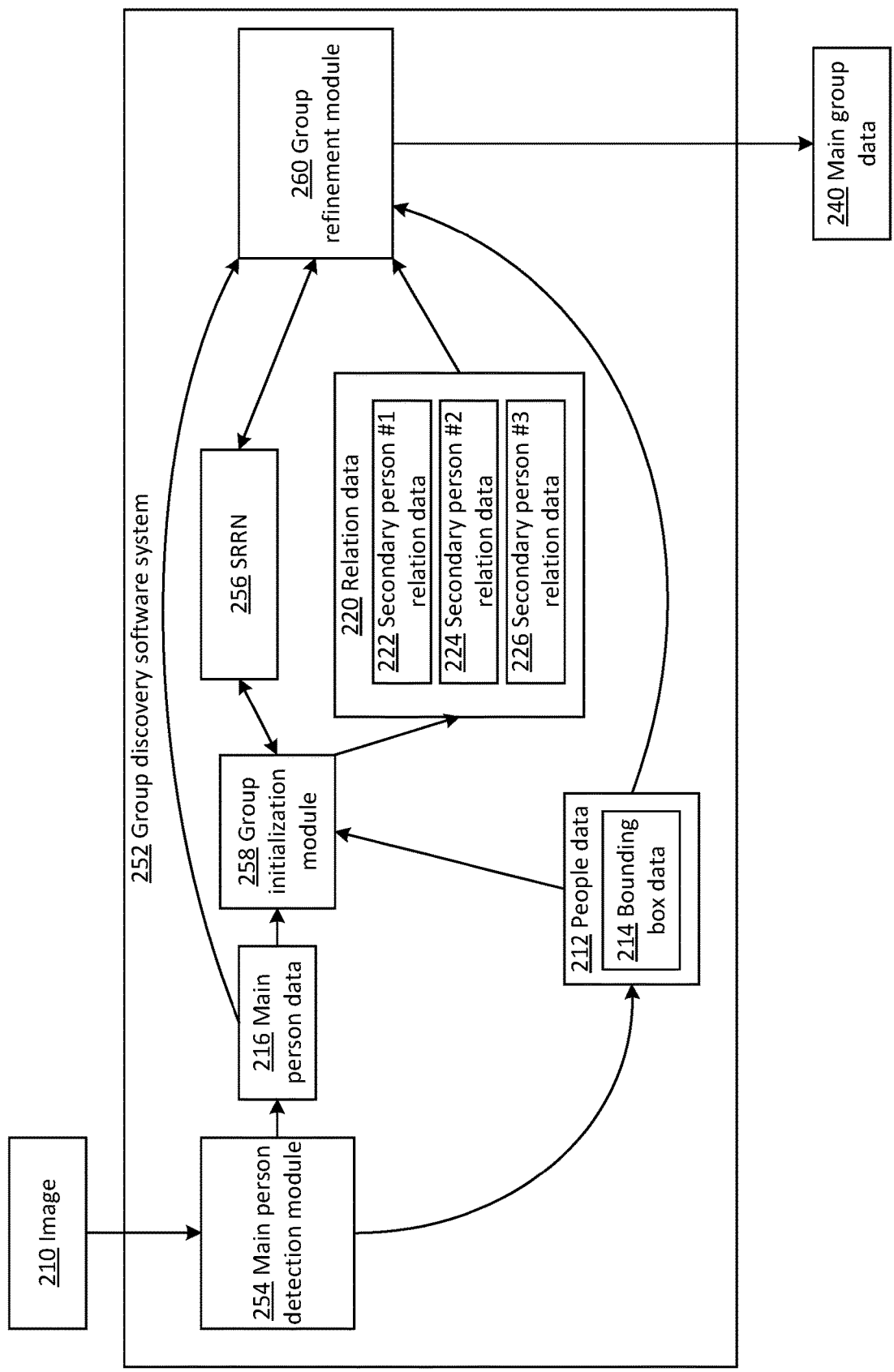
FIG. 3 is a schematic diagram of an example group identification software system according to example embodiments described herein.

FIG. 3 is a schematic diagram showing data flows of an example group identification software system 252 as implemented by the processor 202. The group identification software system 252 takes an image 210 as input, and generates as output main group data 240 identifying a main group of people comprising two or more people visible within the image 210.

Figure 4:
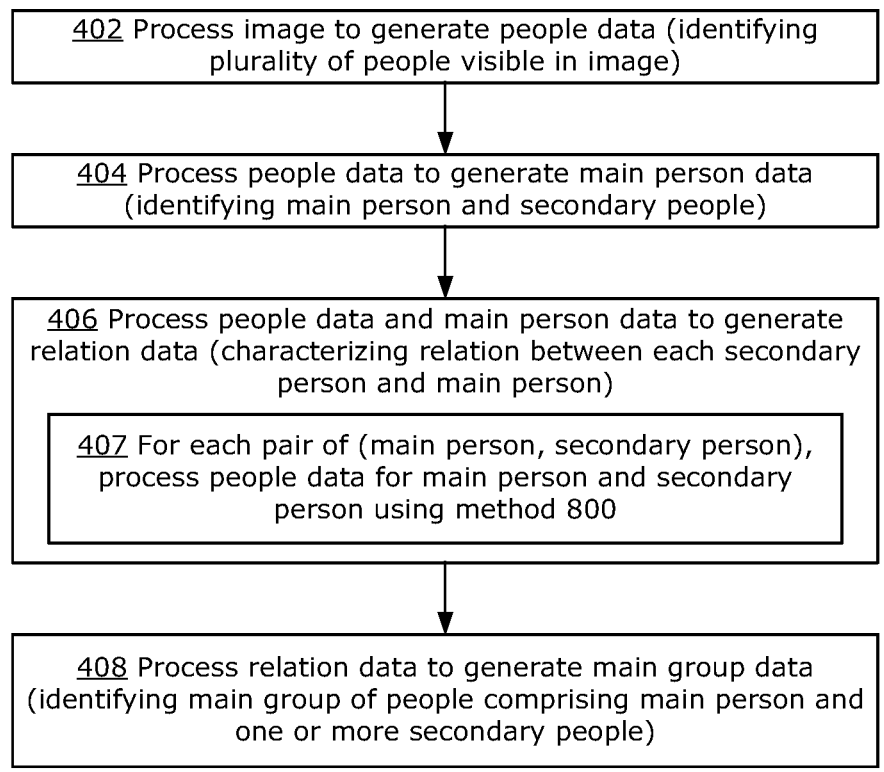
FIG. 4 is a flowchart of an example method for group identification according to example embodiments described herein.

FIG. 4 is a flowchart of an example method 400 for group identification. The steps of method 400 will be described with reference to the group identification software system 252 of FIG. 3. It will be appreciated that the method 400 may be implemented using other means in some embodiments.

At 402, a main person detection module 254 processes the image 210 to generate people data 212 identifying a plurality of people visible in the image 210. In some examples, the people data 212 includes bounding box data 214 representative of the locations, dimensions, and/or pixel contents of bounding boxes surrounding each region of the image 210 where a person is visible. Person detection, and the generation of a bounding box to identify each person detected in the image, may be performed by a model trained using machine learning techniques known in the field of computer vision.

At 404, the main person detection module 254 processes the people data 212 to generate main person data 216 identifying which of the people visible in the image is the main person. Each other person of the plurality of people identified by the people data 212 is thereby designated as a secondary person. In some embodiments, the main person detection module 254 identifies the main person based on the bounding box data 214. The size of each person's bounding box and the distance of each person's bounding box from the center of the image may be used to select the main person. In some examples, the person with the largest bounding box is selected as the main person unless that person's bounding box is close to either the left or right image borders. In the event that the largest bounding box is close to either the left or right image border, a score-based ranking technique is used to choose the main person.

The score-based ranking technique considers the bounding boxes that are larger than a certain percentage of the largest bounding box. A score, $P_{score}$, is computed for each person and the person with the bounding box that yields the highest score is selected as the main person. Mathematically, $$P_{score} = P_h + P_w - \alpha \times D_c,$$

where $P_h$, $P_w$ are the height and width of the person's bounding box, $\alpha$ is a weight parameter and $D_c$ is the person's horizontal (i.e. x-coordinate) distance to the image center. This distance is defined as:

$$D_c = \begin{cases} 0, & \text{if } x_l < x_c < x_r \\ \min\{|x_l - x_c|, |x_r - x_c|\}, & \text{otherwise} \end{cases}$$

where $x_l$, $x_r$ are the left and right horizontal coordinates of the person bounding box and $x_c$ is the horizontal coordinate of the image center. (Coordinates and distances used herein, such as height and width, may refer to pixel coordinates and distances or to another unit of measuring distances within images.)

At 406, a group initialization module 258 processes the people data 212 and the main person data 216 to generate relation data 220 characterizing a relation between the main person and each other person visible in the image 210. The relation data 220 indicates, for each secondary person, relation information (such as social relation information, described above with reference to FIG. 1C) regarding the respective secondary person and the main person. Thus, for example, the illustrated example shows relation data 220 for three secondary people visible in the image 210 aside from the main person: relation data for secondary person #1 222, relation data for secondary person #2 224, and relation data for secondary person #3 226.

In some embodiments, at sub-step 407 of step 406, the relation data 220 is generated by a model, such as a Social Relation Recognition Network (SRRN) as further described herein with reference to FIGS. 7-10, that has been trained using machine learning techniques such as supervised deep learning. Each pair of people being processed (i.e. the main person and one of the secondary people) is provided to the model, and the model generates the relation data 220 for that pair of people. Thus, for example, when secondary person #1 and the main person are provided to the model, the model returns the relation data for secondary person #1 222 characterizing the relation between secondary person #1 and the main person. The model may operate according to various approaches to relation identification. In some embodiments, the model operates according to the description of the SRRN below with reference to FIGS. 7-10. The operations of the SRRN on a received pair of inputs is described below with reference to method 800 of FIG. 8.

In some embodiments, the relation data 220 is binary relation data, as shown in rectangle 152 of FIG. 1C, indicating the presence or absence of a relation between the two people (i.e. the main person and one of the secondary people). In some embodiments, the relation data 220 may include other types of relation information, such as a type of social relationship (e.g., intimate 158, non-intimate 160, and/or any of the subtypes described with reference to FIG. 1C).

In some embodiments, the relation data 220 may identify an initial main group. For example, if the relation data 220 includes binary relation data for each secondary person relative to the main person, then each secondary person with relation data 220 indicating the presence of a relation with the main person is a member of the initial main group. For example, if the image shows three secondary people in addition to the main person, and the relation data 220 includes relation data for secondary person #1 222, relation data for secondary person #2 224, and relation data for secondary person #3 226, having respective values of (0, 1, 1) wherein 0 indicates the absence of a relation and 1 indicates the presence of a relation, then the initial main group would include the following members: the main person, secondary person #2, and secondary person #3.

At 408, a group refinement module processes the relation data 220 to generate main group data 240 identifying a main group of people. The main group of people comprises the main person and one or more main group members selected from the secondary people. In some examples, the main group data 240 identifies the main group as identical to the initial main group described above. In some examples, a group refinement module 260 refines the membership of initial main group by adding or removing one or more members to generate an improved main group and/or a filtered improved main group, and the main group data 240 identifies the main group as the improved main group or the filtered improved main group. The operations of an example group refinement module 260 are described below with reference to FIGS. 5-6.

Figure 5:
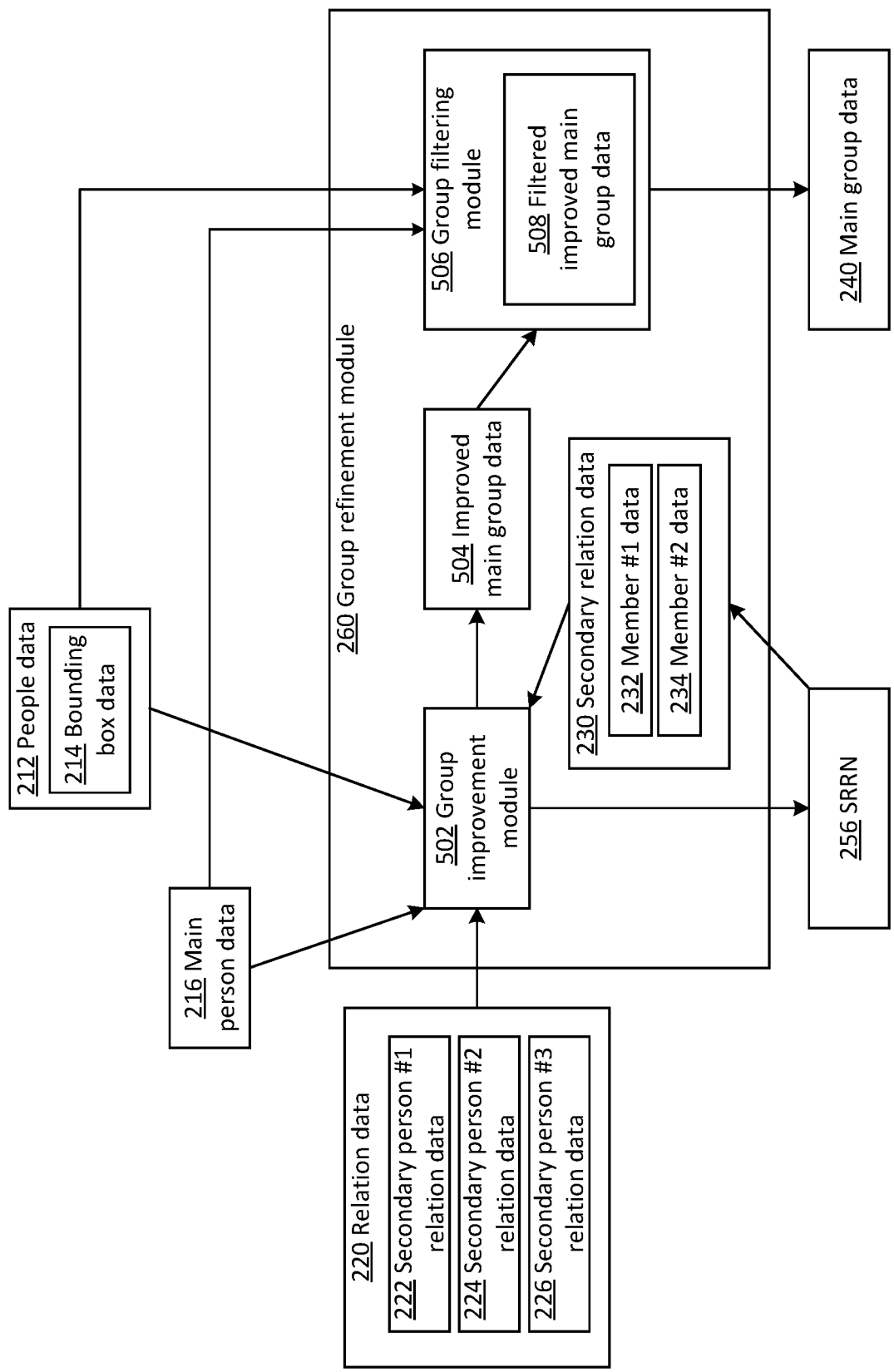
FIG. 5 is a schematic diagram of an example group refinement module of the group identification software system of FIG. 3.

FIG. 5 is a schematic diagram of an example group refinement module 260. Due to imperfect predictions from the SRRN or other model or mechanism used to generate the relation data 220, the initial main group may contain background people (i.e., false positives) or may erroneously omit main group people (i.e., false negatives). The group refinement module 260 is intended to add false negatives to the main group and remove false positives from the main group. These goals are accomplished using two operations: initial main group member voting to generate an improved main group from the initial main group, and post-process filtering to generate a filtered improved main group from the improved main group. These two operations are described in detail below with reference to the method 600 of FIG. 6. It will be appreciated that, in some embodiments, one or both of these operations may be omitted from the operation of the group refinement module 260.

Figure 6:
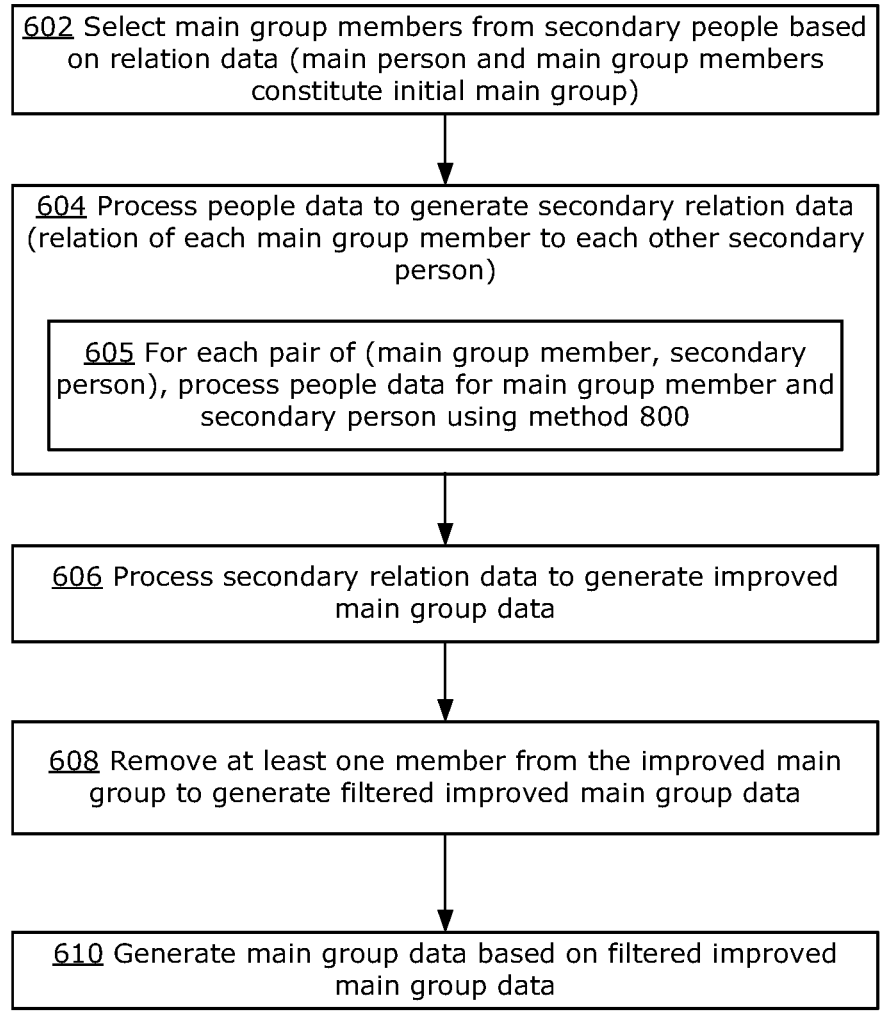
FIG. 6 is a flowchart of an example method for group refinement performed as the final step of the method of FIG. 4.

FIG. 6 is a flowchart of an example method for group refinement 600 implementing an example of the final step 408 of the method 400 of FIG. 4. The method 600 is described as being performed by the group refinement module 260, but in some embodiments one or more steps of the method 600 may be performed by other modules of the group identification software system 252.

At 602, the initial main group is identified based on the relation data 220, as described above. The secondary person members of the initial main group are selected based on their respective relation data 220 (e.g., based on secondary person #2 relation data 224 for secondary person #2), i.e., based on whether the relation data for the respective secondary person indicates a relation to the main person. The initial main group thus includes as members the main person and each secondary person having a relation to the main person.

At 604 and 606, initial main group member voting is performed. Each secondary person in the initial main group is denoted as $p_i$. At 604, for each $p_i$, a candidate group, $G_i$, is constructed. The set of candidate groups for all secondary people who are initial main group members are represented as secondary relation data 230; each candidate group for a given secondary person initial group member is represented as respective member data, e.g. member #1 data 232 for initial group member #1, member #2 data 234 for initial group member #2, etc. The candidate group for a member $p_i$ includes the set of people that are determined (e.g., using the SRRN) to have a relation with $p_i$.

In some embodiments, step 604 includes sub-step 605. At 605, the candidate group for an initial group member $p_i$ is generated by providing to the SRRN each pairing of the respective secondary person initial main group member with one of the plurality of people identified at step 402 of method 400. The output of the SRRN indicates whether a relation is present between the pair of people. The operations of the SRRN on a received pair of inputs is described below with reference to method 800 of FIG. 8.

At 606, after a candidate group is generated for each secondary person initial group member, the candidate groups (i.e. the secondary relation data 230) are processed to obtain an improved main group, represented as improved main group data 504. Specifically, each person visible within the image (i.e. the plurality of people identified at step 402 of method 400, as represented in the people data 212) receives a single vote for each candidate group in which he or she appears. The people that receive a sufficient number of votes (e.g., above a predetermined threshold, which may be a function of the number of people detected in the image 210) are designated as the members of the improved main group. In some examples, this voting step 604 is effective at incorporating false negatives into the main group, but may also filter out some false positives by removing them from the main group.

Thus, for example, an image 210 showing four people may be processed at step 402 to identify the four people. At step 404, one of the four people is designated as the main person, and the other three people are designated as secondary person #1, secondary person #2, and secondary person #3. At step 406, the following three pairs of people are provided to the SRRN: (main person+secondary person #1), (main person+secondary person #2), and (main person+secondary person #3). The corresponding three outputs of the SRRN indicate the relation data 220 for the three secondary people: for example, (0, 1, 1), indicating that the initial main group includes the following members: main person, secondary person #2, and secondary person #3. At step 408, using the group refinement module 260, the initial main group member voting operation is performed. A candidate group is generated for secondary person #2 by providing the following three pairs of people to the SRRN: (main person+secondary person #2), (secondary person #1+secondary person #2), (secondary person #3+secondary person #2). The corresponding three outputs of the SRRN indicate whether the corresponding other person (main person, secondary person #1, secondary person #3) is a member of the candidate group for secondary person #2. A candidate group is also generated for secondary person #3 based on the pairs (main person+secondary person #3), (secondary person #1+secondary person #3), and (secondary person #2+secondary person #3). Assuming for the sake of this example that the candidate group for secondary person #2 is (secondary person #1, secondary person #3), the candidate group for secondary person #3 is (secondary person #2), and the vote threshold is 0 (i.e. any person belonging to more than zero candidate groups is a member of the improved main group), then the improved main group would consist of the members (main person, secondary person #1, secondary person #2, secondary person #3), i.e. the secondary person #1 would be considered a false negative and added to the initial main group due to his or her membership in the candidate group for secondary person #2. When processing images having a larger number of people detected, or a larger number of people in the initial main group, the vote threshold may be set to a higher value. In some embodiments, the main person may also form a candidate group (which may or may not be identical to the initial main group), and a given person's membership in this candidate group may also be counted during in the voting step.

At 608, the post-process filtering operation is performed. The improved main group may be filtered to remove one or more members as false positives. The improved main group data 504 is processed, along with other data such as the image 210 and/or the people data 212, to generate filtered improved main group data 508. In some embodiments, a rule-based approach is used to filter out false positives. The rules consider various factors, including bounding box sizes, relative positions, group cluster structure, and human head pose. The majority of these rules are based on statistics of the bounding boxes represented in the bounding box data 214. However, in some embodiments, rules based on head-pose are applied using a head-pose estimation model trained using known machine learning techniques, such as a head-pose estimation network. In some embodiments, the outputs of the head-pose estimation network provide the viewing direction of each of the people in the improved main group.

In various examples, a member may be removed from the improved main group based on one or more of the following characteristics of the person data 212: a bounding box size differential of the member relative to the main person, a view direction differential of the member relative to the main person, and/or a bounding box location of the member relative to at least one other improved main group member. For example, a member of the improved main group may be regarded as a false positive and therefore excluded from the filtered improved main group if his or her bounding box is much smaller than that of the main person, if the main person if facing forward but the member is facing away from the camera, or if the member is standing on the left or right edge of the improved main group and a large spatial gap separates him or her from the closest improved main group member. For example, the member may be excluded if the spatial gap between the member and the closest other improved main group member is greater in size than any gap between any two other improved main group members, i.e., the other improved main group members are clustered tightly together but the removed member is separated from the group by a large gap. In some examples, a threshold size may be used for the maximum gap size, and the threshold size may be based on the gaps between other improved main group members.

At 610, the main group data 240 is generated by the group refinement module 260 based on the filtered improved main group data 508. In some embodiments, the main group data 240 is the filtered improved main group data 508, and the main group identified by the method 400 is the filtered improved main group. In other embodiments, the post-process filtering step may be omitted: the main group data 240 is the improved main group data 504, and the main group identified by the method 400 is the improved main group.

SRRN

Figure 7:
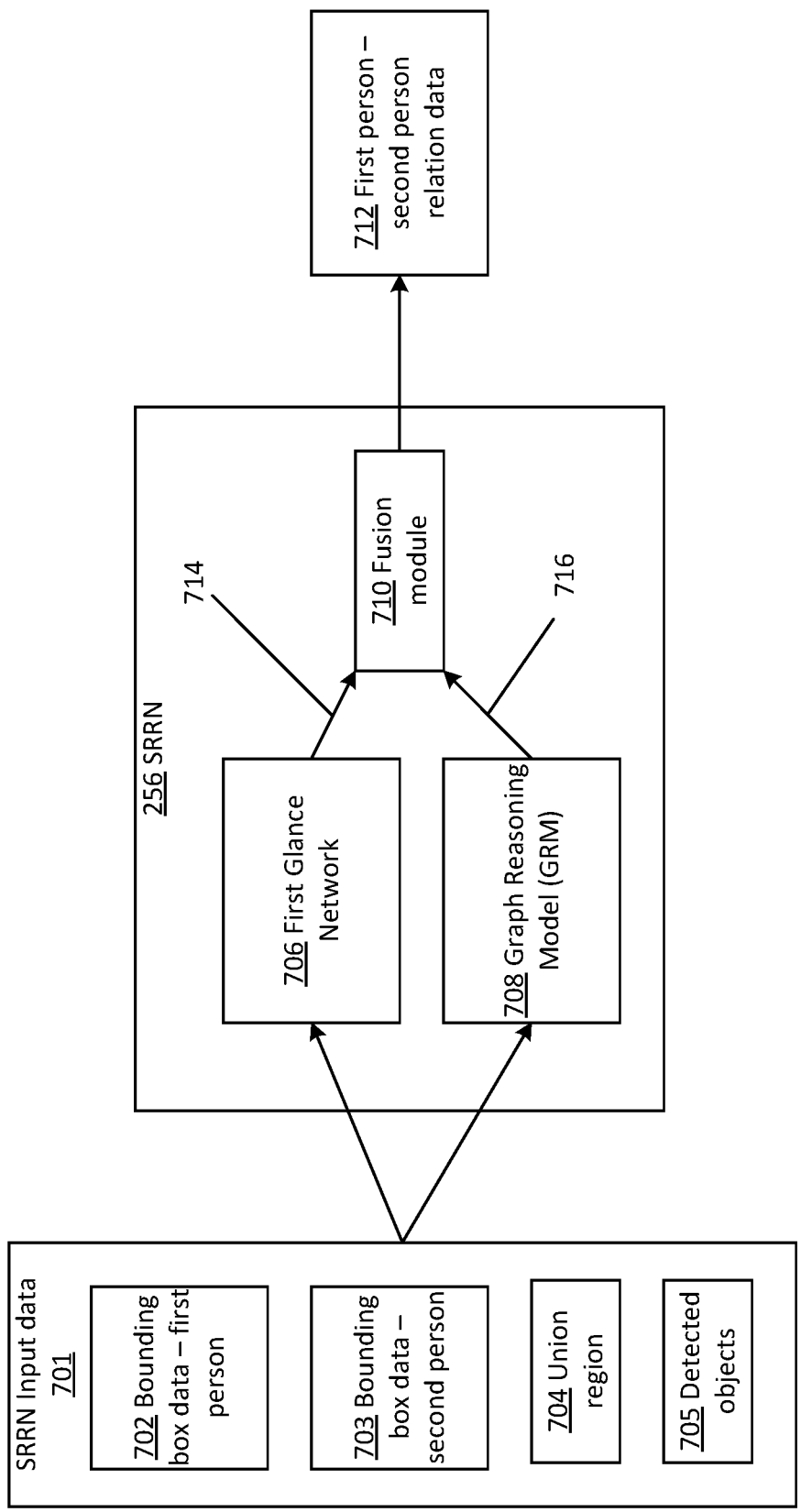
FIG. 7 is a schematic diagram of an example SRRN of the group identification software system of FIG. 3.

FIG. 7 is a schematic diagram of an example SRRN 256 used by the group identification software system 252. As described above, the SSRN 256 may be used at sub-step 407 of method 400 and/or at sub-step 605 of method 600 to generate relation data based on inputs representative of the people data 212 (e.g. bounding box data 214) for a pair of people detected in an image.

The example SRRN 256 shown in FIG. 7 includes two separate group identification models operating in parallel on the same pair of inputs. The outputs of the two models are then fused to generate a single fused output, which is used as the relation data 220 for the pair of people represented in the people data 212 inputs.

The first model is a First Glance network 706, as described by Li, Junnan, et al. "Dual-glance model for deciphering social relationships." in ICCV 2017, which is hereby incorporated by reference in its entirety. The Li paper describes a model using a "first glance" subnetwork and a "second glance" subnetwork. However, in some embodiments the example SRRN 256 may use only a First Glance network 706, as described below with reference to FIG. 9. Furthermore, the First Glance network 706 may be further modified from the techniques described in the Li paper: for example, the First Glance network 706 may be trained using a class-balanced loss, as described further below in reference to FIG. 9. The output of the First Glance network 706 is a First Glance softmax output 714 generated by a softmax function (as described further below in reference to FIG. 9).

The second model is a Graph Reasoning Model (GRM) 708, as described by Wang, Zhouxia, et al. "Deep reasoning with knowledge graph for social relationship understanding." in IJCAI 2018, which is hereby incorporated by reference in its entirety. An example GRM 708 is described below in reference to FIG. 10. The output of the GRM 708 is a GRM softmax output 716 generated by a softmax function (as described further below in reference to FIG. 10).

Figure 8:
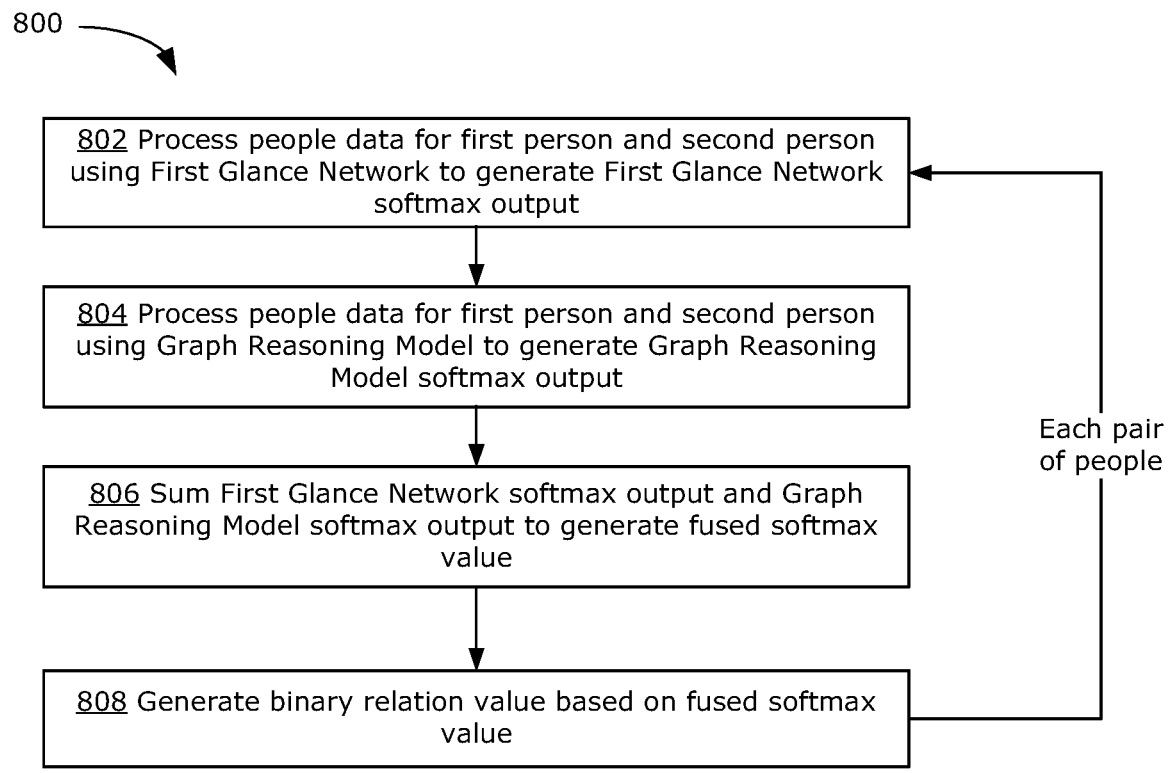
FIG. 8 is a flowchart of an example method for generating relation data performed by the SRRN of FIG. 7 during steps of the methods of FIG. 4 and FIG. 6.

FIG. 8 is a flowchart of an example method 800 for generating relation data 220 performed by the SRRN 256. The operations of the SRRN 256 will be described in the context of method 800.

The inputs 701 of the SRRN 256 are: the image patches (i.e. pixel contents of the bounding boxes) of two people (shown as first person bounding box data 702 and second person bounding box data 703), the union region 704 of the two people's bounding boxes (i.e. the pixels shown within each bounding box, including any overlapping regions), and all detected scene objects 705. The detected scene objects 705 may include people data 212 (i.e. the pixels within each other bounding box in the image 210 generated at step 402), and possibly also object data (not shown) generated by conventional object detection techniques from the field of computer vision and deep learning. The output of the SRRN 256 is relation data 220, e.g., binary relation data indicating whether or not the two people have a social relationship.

The final social relation prediction of the SRRN 256, shown as first person-second person relation data 712, is obtained via score fusion of the First Glance network 706 and Graph Reasoning model 708. In some embodiments, a late-fusion strategy is adopted for score fusion, whereby a softmax function is first applied to the raw network outputs of each model 706, 708, yielding First Glance softmax output 714 and GRM softmax output 716. The softmax outputs 714, 716 are then fused by being added together, i.e. summed, yielding a final set of social relation scores 712. In some embodiments, a threshold is applied to the scores to ascertain whether the pair of individuals is considered to have a social relationship, i.e. to convert the summed softmax output (first person-second person relation data 712) into a binary relation value. It will be appreciated that some embodiments may preserve the vector information encoded in the fused softmax output 712, or may fuse the two softmax outputs 714, 716 of the models by averaging their values or otherwise preserving a normalized probability distribution.

Thus, in operation, the example SRRN 256 performs example method 800. At 802, the First Glance network 706 processes the inputs 702, 703, 704, 705, including the people data 212 for the first person and second person, to generate the First Glance softmax output 714. At 804, the GRM 708 processes the inputs 702, 703, 704, 705, including the people data 212 for the first person and second person, to generate the GRM softmax output 716. At 806, the First Glance softmax output 714 and GRM softmax output 716 are summed to generate the fused softmax value, i.e. the first person-second person relation data 712, which may be a vector value representative of a sum of two probability distributions across two or more relation classes (e.g., across the various social relationship types shown in FIG. 1C). At 808, a threshold is applied to the fused softmax value 712 to generate a binary relation value for the first person and second person indicating the presence or absence of a social relation.

Figure 9:
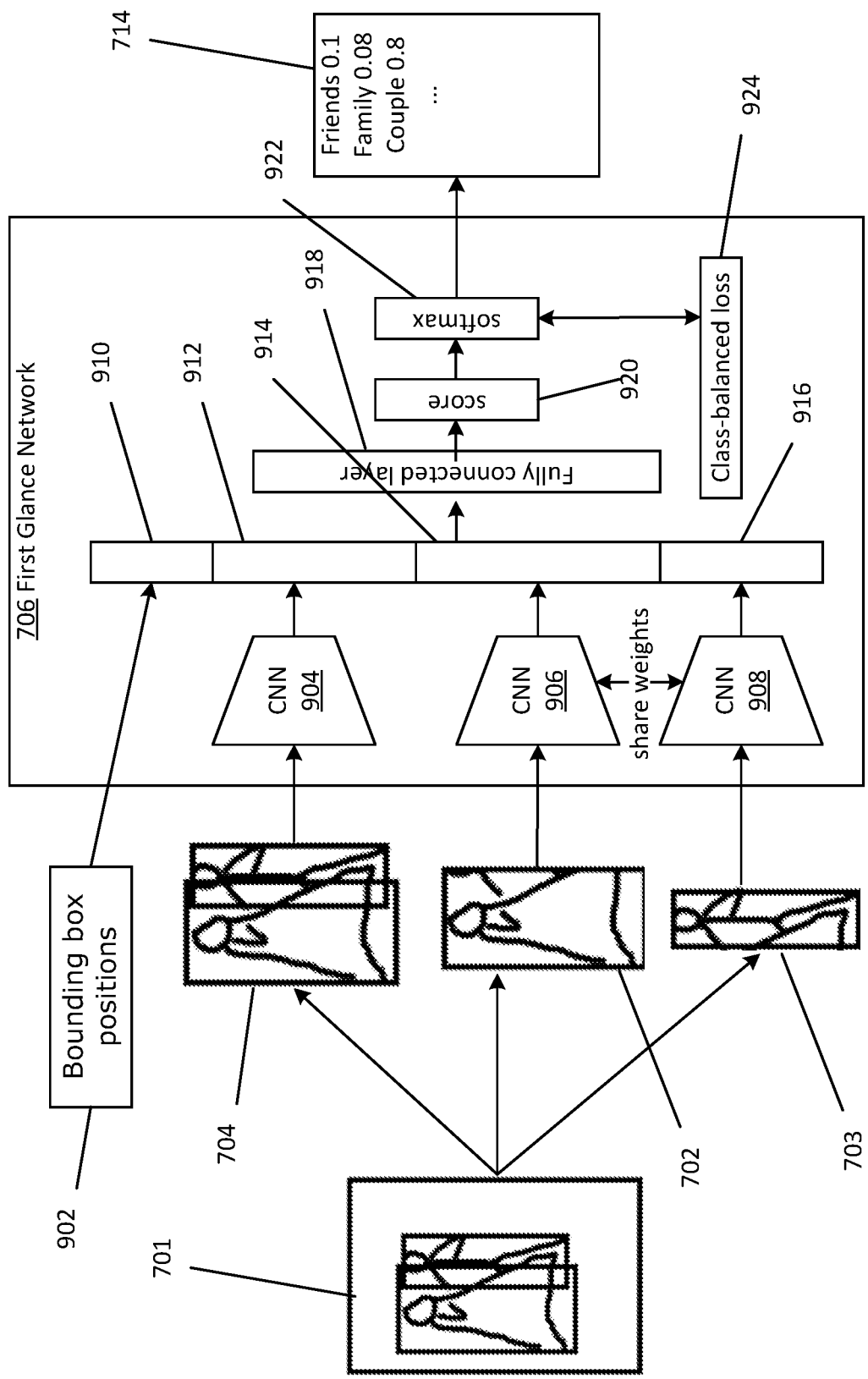
FIG. 9 is a schematic diagram of an example First Glance Network of the SRRN of FIG. 7.

FIG. 9 is a schematic diagram of an example First Glance Network of the SRRN of FIG. 7. For the sake of clarity, the SRRN input data 701 is shown as the source image 210 with bounding boxes around the two people being assessed for a social relation, i.e. the first person and second person. However, it will be appreciated that the SSRN input data 701 is as described above with reference to FIGS. 7-8, i.e., the image patch of the first person 702, the image patch of the second person 703, the union region 704 of the two people's bounding boxes, and optionally one or more detected scene objects 705. The locations within the image of the two people's bounding boxes 902 are also provided; this data may be encoded in the bounding box data 214. The bounding box location data 902 is encoded as a first vector 910. The union region 704 is processed by a first convolution neural network (CNN) 904 to generate a second vector 912. The image patch of the first person 702 is processed by a second CNN 906 to generate a third vector 914. The image patch of the second person 703 is processed by a third CNN 908 to generate a fourth vector 916. In some embodiments, the second CNN 906 and third CNN 908 share weights, i.e. they are duplicates of a single CNN trained to perform the same task, as both CNNs 906, 908 are trained to process an image patch of a single visible person in an image.

The four vectors 910, 912, 914, 916 are concatenated, and the concatenated vector result is provided to a fully connected layer 918 as input. The fully connected layer 918 processes the concatenated vector input to generate a score 920 (e.g., a non-normalized vector distribution across a plurality of relation classes, such as the social relationship types of FIG. 1C). A softmax function 922 is applied to the score 920 to generate the First Glance softmax output 714, which is shown as a normalized probability distribution across the social relationship types of FIG. 1C. In the illustrated example, the image 210 showing a bride and groom at a wedding results in a normalized probability of 0.8 that the relation between the first person (i.e. the bride) and the second person (i.e. the groom) is "couple", with a friend relationship at 0.1 and a family relationship at 0.08. The remaining 0.02 would be distributed among other classes (e.g., various non-intimate social relationships, or the absence of a social relationship).

In the illustrated example, the First Glance network 706 is modified to use a class-balanced loss 924 during training. Class-balanced losses are more useful than conventional loss functions for training models to perform tasks such as main group identification and social relation classification. Due to the nature of the social relation classification task considered by the First Glance network 706, training data tends to be imbalanced toward pairs of individuals that exhibit no social relations. The class-balanced loss helps to correct for this unevenness in the number of training samples and ensures that the First Glance network 706 is well-trained. It will be appreciated that this form of weighting may be unnecessary for the GRM 708 due to its graph structure.

A class-balanced loss is described by Cui, Yin, et al. "Class-balanced loss based on effective number of samples." in CVPR 2019, which is hereby incorporated by reference in its entirety. The Cui paper describes class-balanced loss as follows. For an input sample x with label $y \in \{1, 2, \ldots, C\}$, where C is the total number of classes (e.g., six classes: no relation, the three intimate social relationship types, and the two non-intimate social relationship types of FIG. 1C), suppose the First Glance network's 706 estimated class probabilities are $p=[p1, p2, \ldots, pC]^T$, where $pi \in [0, 1] \forall i$, the loss is denoted as $\mathcal{L}(p, y)$. If the number of samples (i.e. the number of pairs of people being processed by the SRRN) for class i is $n_i$, the proposed effective number of samples for class i is $E_{n_i}=(1-\beta_i^{n_i})/(1-\beta_i)$, where $\beta_i=(N_i-1)/N_i$. Without further information of data for each class, it is difficult to empirically find a set of good hyperparameters Ni for all classes. Therefore, in practice, one can assume Ni is only dataset-dependent, and therefore one may set the values of Ni=N, $\beta=\beta_i=(N-1)/N$ for all classes in a dataset.

The class-balanced (CB) loss can be written as:

$$CB(p, y) = \frac{1}{E_{n_y}} \mathcal{L}(p, y) = \frac{1-\beta}{1-\beta^{n_y}} \mathcal{L}(p, y)$$

where $n_y$ is the number of samples in the ground-truth class y. Note that $\beta=0$ corresponds to no re-weighting, and $\beta \to 1$ corresponds to re-weighing by inverse class frequency. The proposed novel concept of effective number of samples enables the use of a hyperparameter $\beta$ to smoothly adjust the class-balanced term between no re-weighting and re-weighing by inverse class frequency.

Figure 10:
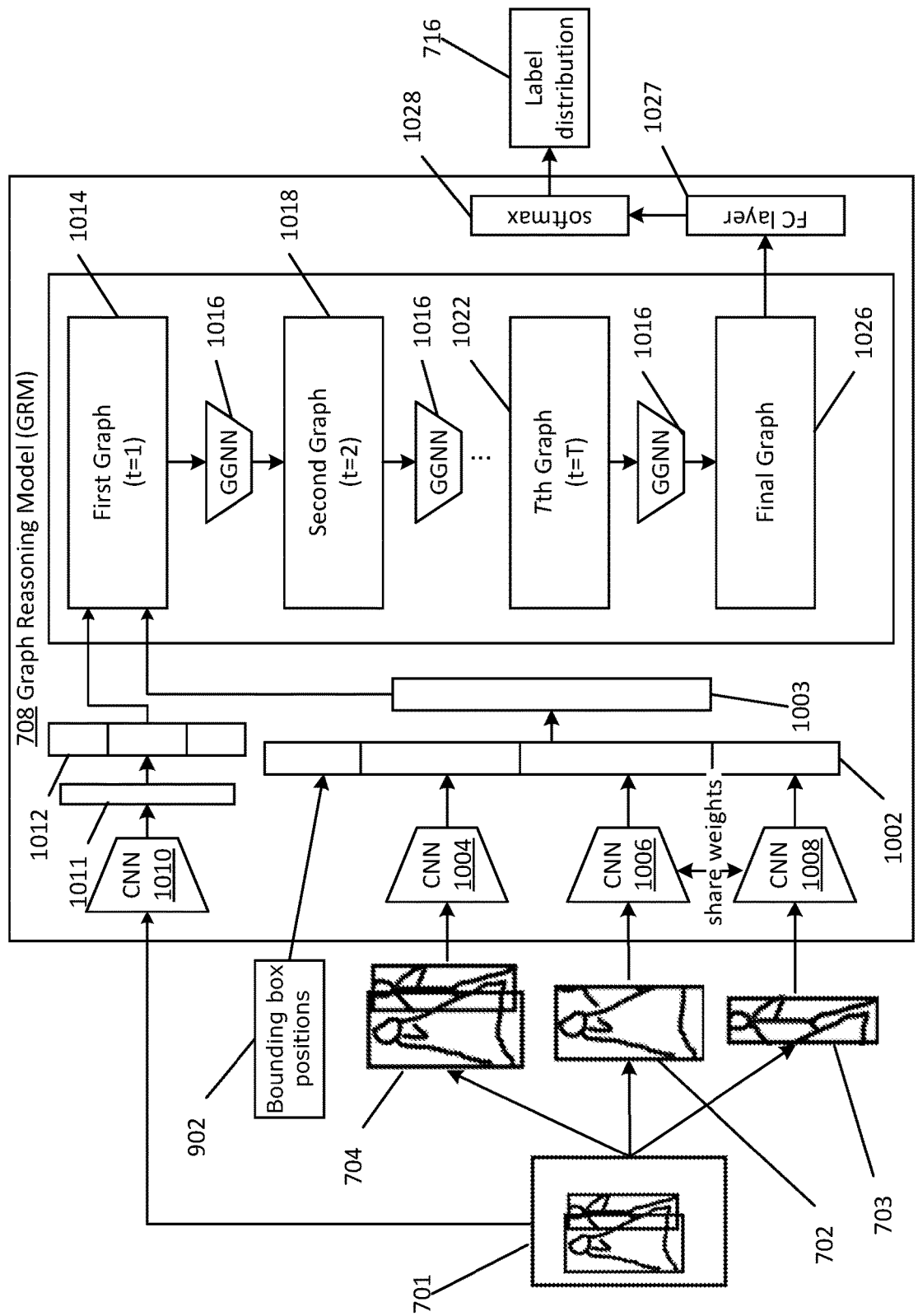
FIG. 10 is a schematic diagram of an example Graph Reasoning Model of the SRRN of FIG. 7.

FIG. 10 is a schematic diagram of an example Graph Reasoning Model 708 of the SRRN 256. In general terms, the GRM 708 includes a lower feature extraction portion that operates analogously to the initial First Glance network 706 stages, an upper feature extraction portion that operates to extract features from various regions of the image 210 or objects detected in the image 210 (as represented by the detected scene objects 705), and a graph reasoning portion that proceeds by stages using gated graph reasoning to refine a graph of people and objects in the scene to generate prediction data characterizing a relation between the two people.

As in FIG. 9, the inputs 701 are shown as the image 210 with bounding boxes around the two people whose relation is being characterized. As in FIG. 9, the lower feature extraction portion includes three CNNs 1004, 1006, 1008 to process the union region 704, the image patch of the first person 702, and the image patch of the second person 703 respectively, with the second CNN 1006 and third CNN 1008 sharing weights; the vector outputs of the three CNNs 1004, 1006, 1008 are concatenated, along with the bounding box location data 902, to form a concatenated vector 1002 as in FIG. 9. A fully connected layer 1003 processes the concatenated vector 1002 and uses it to initialize the hidden state of the relationship nodes of a first graph at time step t=1 1014.

The upper feature extraction portion uses a further CNN 1010 to process the detected scene objects 705, such as cars, dogs, people, umbrellas, etc., to characterize features of scene regions or objects within the image 210. The features of the scene objects are extracted from a CNN-based pre-trained object detector 1011 and provided as a concatenated vector 1012 to initialize the input hidden state of the object nodes of the first graph 1014. Thus, the first graph at time step t=1 1014 consists of a graph of object nodes connected to each other through relationship nodes. Each object node corresponds to a detected object or person within the image 210, and each relationship node corresponds to a predicted relationship between object nodes.

The graph reasoning portion of the GRM 708 operates to process the initialized first graph 1014 using a Gated Graph Neural Network (GGNN) 1016, as described by Yujia Li, Daniel Tarlow, Marc Brockschmidt, and Richard Zemel.

Gated graph sequence neural networks. arXiv preprint arXiv:1511.05493, 2015, which is hereby incorporated by reference in its entirety. When operating on the first graph, the GGNN allows the object and relationship nodes to aggregate information from their neighbors using a message-passing framework. Each node uses the aggregate information from its neighbors along with its own hidden state from time step t=1 to produce its new hidden state for the next time step (i.e., t=2). After being processing by the GGNN at time step t=1 1016, a graph with updated hidden features 1018, is then processed by the GGNN 1016 once again, and so on for a total of T iterations (T being a positive integer). The result after the T iterations of processing by the GGNN 1016 is a final graph 1026, with an updated set of hidden features for each node. For each relationship node, the hidden feature vector is concatenated with the hidden features of the object nodes. This concatenated vector is passed through a single fully connected neural network layer 1027 to produce the unnormalized scores indicating the existence of a relation between the first person and second person under consideration. The unnormalized score vector is then provided to a softmax function 1028, which generates a normalized probability distribution across a plurality of relationship classes, shown as a label distribution (i.e. GRN softmax output 716). It will be appreciated that some embodiments may further utilize graph attention mechanisms to highlight and weight objects that are particularly informative in distinguishing between different social relations.

Example embodiments described herein may provide novel and useful computer vision techniques. The example group identification software systems 252 described herein contain a number of innovations over existing techniques. The specific combination of operations and components used to perform those operations may enable accurate identification of a main group of people in an image, by leveraging the ability to identify social relationships. The example SRRNs described herein may provide improved techniques for identifying such social relationships as between two people identified within an image. Each of these improved techniques may improve the functioning of a device with access to the group identification software system 252: such devices may be able to perform or assist with image-related tasks such as image editing (e.g., cropping or emphasizing regions of the photo to focus on the main group), group behaviour analysis (e.g., detecting certain group behaviours visible in photographs or video frames), photo management (e.g., sorting a photo library based on the members or nature of the main group), and personalized recommendations (e.g., displaying advertisements on a TV or other display that are relevant to the main group that is watching the display).

Methods and Processor Readable Media

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The above examples are example only, and thus are not intended to limit in any way the definition and/or meaning of the term "processor".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for identifying a main group of people in an image, comprising:

processing the image to generate people data identifying a plurality of people at least partially visible in the image;

processing the people data to generate main person data identifying a main person of the plurality of people, each other person of the plurality of people being a secondary person;

processing the people data and the main person data to generate, for each secondary person, relation data characterizing a relation between the secondary person and the main person, wherein the relation data is generated by a model trained using machine learning, wherein the model comprises a trained First Glance network trained using a class-balanced loss;

processing the relation data for the secondary people to generate main group data identifying a main group of people comprising the main person and one or more main group members selected from the secondary people.

2. The method of claim 1, wherein the people data comprises, for each person of the plurality of people, a bounding box.

3. The method of claim 2, wherein processing the people data to generate the main person data comprises processing:
a size of each bounding box; and
a distance from a center of the image of each bounding box to generate the main person data.

4. The method of claim 1, wherein the relation data comprises a binary relation value indicating the presence or absence of a social relationship.

5. The method of claim 1, wherein the model further comprises a trained Graph Reasoning model.

6. The method of claim 1, wherein:
the model further comprises a trained Graph Reasoning model; and
the model generates the relation data by fusing an output of the trained First Glance network and an output of the trained Graph Reasoning model.

7. The method of claim 6, wherein fusing the outputs of the trained First Glance model and the trained Graph Reasoning model comprises:
summing an output of a softmax function of the trained First Glance network and an output of a softmax function of the trained Graph Reasoning model to generate a fused softmax value; and
generating a binary relation value, indicating the presence or absence of a social relationship, based on the fused softmax value.

8. The method of claim 1, wherein processing the relation data to generate the main group data comprises:
selecting the one or more main group members from the secondary people based on whether the relation data for a respective secondary person indicates a relation to the main person, the main person and the selected one or more main group members constituting an initial main group; and
refining the initial main group by:
processing at least a portion of the people data to generate, for each selected main group member of the secondary people, secondary relation data characterizing a relation of the selected main group member to each other secondary person; and
processing the secondary relation data for each initial main group member to generate improved main group data identifying members of an improved main group, the main group data being based on the improved main group data.

9. The method of claim 8, wherein processing the relation data to generate the main group data further comprises:
removing at least one member from the improved main group to generate filtered improved main group data by processing the improved main group data and one or more of the following characteristics of the person data:
a bounding box size differential of the at least one member relative to the main person;
a view direction differential of the at least one member relative to the main person; and
a bounding box location of the at least one member relative to at least one other improved main group member, the main group data being based on the filtered improved main group data.

10. The method of claim 9, wherein:
the filtered improved main group data is generated by processing at least the bounding box location of the at least one member relative to at least one other improved main group member; and
processing the bounding box location of the at least one member relative to at least one other improved main group member comprises determining that:
the at least one member is located on an edge of the improved main group; and
a spatial gap between the at least one member and a closest other improved main group member is greater in size than any gap between any two other improved main group members.

11. The method of claim 10, wherein:
the relation data is generated by a model comprising:
a First Glance network trained using machine learning using a class-balanced loss; and
a Graph Reasoning model trained using machine learning; and
the model generates the relation data by fusing an output of the First Glance network and an output of the Graph Reasoning model by:
summing an output of a softmax function of the First Glance network and an output of a softmax function of the Graph Reasoning model to generate a fused softmax value; and
generating a binary relation value, indicating the presence or absence of a social relationship, based on the fused softmax value.

12. A computing system comprising:
a processor; and
a memory storing processor-executable instructions thereon, wherein the instructions, when executed by the processor, cause the computing system to identify a main group of people in an image by:
processing the image to generate people data identifying a plurality of people at least partially visible in the image;
processing the people data to generate main person data identifying a main person of the plurality of people, each other person of the plurality of people being a secondary person;
processing the people data and the main person data to generate, for each secondary person, relation data characterizing a relation between the secondary person and the main person, wherein the relation data is generated by a model trained using machine learning, wherein the model comprises a trained First Glance network trained using a class-balanced loss;

processing the relation data for the secondary people to generate main group data identifying a main group of people comprising the main person and one or more main group members selected from the secondary people.

13. The system of claim 12, wherein:

the people data comprises, for each person of the plurality of people, a bounding box; and processing the people data to generate the main person data comprises processing:
- a size of each bounding box; and
- a distance from a center of the image of each bounding box to generate the main person data.

14. The system of claim 12, wherein the model further comprises:
- a Graph Reasoning model trained using machine learning; and
- the model generates the relation data by:
  - summing an output of a softmax function of the First Glance network and an output of a softmax function of the Graph Reasoning model to generate a fused softmax value; and
  - generating a binary relation value, indicating the presence or absence of a social relationship, based on the fused softmax value.

15. The system of claim 12, wherein processing the relation data to generate the main group data comprises:
- selecting the one or more main group members from the secondary people based on whether the relation data for a respective secondary person indicates a relation to the main person, the main person and the selected one or more main group members constituting an initial main group; and
- refining the initial main group by:
  - processing at least a portion of the people data to generate, for each selected main group member of the secondary people, secondary relation data characterizing a relation of the selected main group member to each other secondary person; and
  - processing the secondary relation data for each initial main group member to generate improved main group data identifying members of an improved main group, the main group data being based on the improved main group data.

16. The system of claim 15, wherein processing the relation data to generate the main group data further comprises:
- removing at least one member from the improved main group to generate filtered improved main group data by processing the improved main group data and one or more of the following characteristics of the person data:
  - a bounding box size differential of the at least one member relative to the main person;
  - a view direction differential of the at least one member relative to the main person; and
  - a bounding box location of the at least one member relative to at least one other improved main group member,
- the main group data being based on the filtered improved main group data.

17. The system of claim 16, wherein:
the filtered improved main group data is generated by processing at least the bounding box location of the at least one member relative to at least one other improved main group member;

processing the bounding box location of the at least one member relative to at least one other improved main group member comprises determining that:
- the at least one member is located on an edge of the improved main group; and
- a spatial gap between the at least one member and a closest other improved main group member is greater in size than any gap between any two other improved main group members;

the model further comprising:
- a Graph Reasoning model trained using machine learning; and
- the model generates the relation data by:
  - summing an output of a softmax function of the First Glance network and an output of a softmax function of the Graph Reasoning model to generate a fused softmax value; and
  - generating a binary relation value, indicating the presence or absence of a social relationship, based on the fused softmax value.

18. A non-transitory processor-readable medium having machine-executable instructions stored thereon which, when executed by a processor of a device, cause the device to identify a main group of people in an image by:
- processing the image to generate people data identifying a plurality of people at least partially visible in the image;
- processing the people data to generate main person data identifying a main person of the plurality of people, each other person of the plurality of people being a secondary person;
- processing the people data and the main person data to generate, for each secondary person, relation data characterizing a relation between the secondary person and the main person, wherein the relation data is generated by a model trained using machine learning, wherein the model comprises a trained First Glance network trained using a class-balanced loss;
- processing the relation data for the secondary people to generate main group data identifying a main group of people comprising the main person and one or more main group members selected from the secondary people.

* * * * *